United States Patent [19]

Stackling et al.

[11] Patent Number: 5,232,292
[45] Date of Patent: Aug. 3, 1993

[54] SEALED BEARING WITH MOUNTING GROOVES FOR SEALING MEMBERS

[75] Inventors: Håkan Stackling, Askim; Jonas Olsson, Mölndal, both of Sweden

[73] Assignee: AB SKF, Gothenburg, Sweden

[21] Appl. No.: 919,738

[22] Filed: Jul. 27, 1992

[51] Int. Cl.$^5$ ............................................. F16C 33/78
[52] U.S. Cl. .................................... 384/484; 277/35; 277/189; 384/477
[58] Field of Search ............... 384/477, 484–486, 384/558, 568, 564; 277/35, 152, 189

[56] References Cited

U.S. PATENT DOCUMENTS

| | | | |
|---|---|---|---|
| 2,277,810 | 3/1942 | Zotter | 384/477 X |
| 3,113,814 | 12/1963 | Ogura | 384/484 |
| 3,473,856 | 10/1969 | Helms | 384/485 X |
| 3,748,003 | 4/1974 | Piva | 384/484 |
| 3,806,212 | 7/1973 | Barber | 384/486 X |
| 4,755,067 | 7/1988 | Asberg et al. | |
| 4,790,543 | 12/1988 | Wittmeyer et al. | |
| 4,805,919 | 2/1989 | Wiblyi et al. | 384/477 X |
| 4,846,592 | 7/1989 | Tsumori et al. | 384/477 X |

Primary Examiner—Thomas R. Hannon
Attorney, Agent, or Firm—Burns, Doane, Swecker & Mathis

[57] ABSTRACT

A sealed bearing includes inner and outer race rings, roller members disposed therebetween, and built-in sealing members for sealing the space in which the roller members are situated. The outer race ring is equipped with a mounting groove 5 for each sealing member. The groove is situated axially inside of a side plane of the outer race ring and is inclined obliquely relative to that side plane. The mounting groove has an opening situated axially outside of the outer race track, whereas at least a part of the inner end of the groove is situated axially inside of the outer axial end of the outer race track.

11 Claims, 2 Drawing Sheets

SEALED BEARING WITH MOUNTING GROOVES FOR SEALING MEMBERS

BACKGROUND OF THE INVENTION

The present invention refers to sealed bearings incorporating an inner race ring, outer race ring, rolling bodies arranged between the inner race ring and the outer race ring in one or more rows, and so-called built-in sealing members, whereby the outer race ring, at least at one of its sides, is equipped with a mounting groove for receiving the sealing member, the groove being situated inside the side plane of the outer race ring and being arranged to taper at an angle relative to the side plane.

The "life span" of a bearing is reduced by dirt and impurities penetrating into the bearing. The assembly of the bearing, on one hand, may occur in dirty surroundings, and the bearings may, on the other hand, during operation, be exposed to dirt, metal chips, and the like. Also, during use of bearings in continuous casting machines, rolling mills, paper making machines, etc., the bearings may be highly exposed to different kinds of impurities. This also places high demands on maintenance.

Thus, a good seal for a bearing in many cases can be most important, on one hand for increasing the life span and on the other hand for reducing the maintenance.

Known solutions for designing sealed bearings are based on two different principles, i.e., a seal can either be assembled onto a bearing or be built into the bearing. Embodiments of how a seal is assembled onto a bearing is shown, e.g., in Wittmeyer et al U.S. Pat. No. 4,790,543 and Asberg et al U.S. Pat. No. 4,755,067. The seal in these embodiments is constituted by two cooperating sheet metal rings, whereby at least one of the sheet metal rings is notch-joined into the outer race ring, whereas the other is fitted to the inner race ring. This solution, however, means that the seal will project outside the side planes of the race rings, which in some cases necessitates modification of the bearing housing and also of the mounting and dismantling tools.

According to the other alternative mentioned above, the seal is built into the bearing. In this case the seal does not project beyond the side planes of the race rings. Assembly of the seal inside one of the bearing side planes requires space and for this reason the width of the bearing itself can be increased, or, in the case with roller bearings, the roller length has been reduced.

In one known sealed bearing, the width of the bearing has been increased as compared to a corresponding unsealed bearing in order to maintain the carrying capacity. In that case, the seal is mounted in a radial groove formed in the outer race ring, where it is fixed with a locking ring, and the opposite side of the seal engages a tapering surface on the inner race ring. (It is also known to attach the seal in the outer race ring with some type of rubber lip.)

The attachment of the seal in a radial locking ring groove requires large axial space which means that the outer race ring necessarily will become wide if the carrying capacity shall be maintained. That is a drawback, as it is desirous to keep the bearing as small and compact as possible due to the particular uses for which the bearing is intended, and to maintain the ISO-width according to ISO standards.

Another drawback is that an attachment with a rubber lip does not give the high retaining force desired.

In spherical roller bearings, in contrast to others, the set of rollers may hit and dislodge the seal.

Purposes of the present invention include providing a sealed bearing having a built-in seal, wherein the attachment of the seal requires a minimum of assembly space; the outer race ring preferably should not be made wider as compared to unsealed bearings. The carrying capacity, speed ranges, and the like should also not be adversely affected.

SUMMARY OF THE INVENTION

The present invention relates to a sealed bearing comprising an outer race ring having inner and outer race tracks, respectively. The inner and outer race tracks are disposed opposite one another and form a space therebetween. At least one row of rolling bodies arranged in the space. A built-in sealing member engages the inner and outer race members for sealing at least one axial end of the space. The outer race ring includes a groove in which the sealing member is mounted. The groove is situated axially inwardly relative to a side plane of the outer race ring and is inclined obliquely relative to the side plane. The mounting groove includes an opening at an outer end. The opening is disposed axially outwardly with respect to an outer axial end of the outer race track. The groove includes an inner end at least a portion of which extends axially inwardly with respect to the outer axial end of the outer race track. Preferably, the sealing member is attached to the outer race ring by means of a locking ring provided in the groove.

For achieving a safe attachment of the seal member it has been established that it is particularly favorable if the locking ring is tapering and has a taper angle which is somewhat smaller than the taper angle of the groove, so that a preload is obtained between locking ring groove and seal. It has been found to be appropriate to use a groove taper angle of between 15 and 20 degrees.

The bearing is preferably a spherical roller bearing.

BRIEF DESCRIPTION OF THE DRAWING

The objects and advantages of the invention will become apparent from the following detailed description of a preferred embodiment thereof in connection with the accompanying drawings, in which like numerals designate like elements, and in which.

DETAILED DESCRIPTION OF PREFERRED EMBODIMENTS OF THE INVENTION

Figure 1:
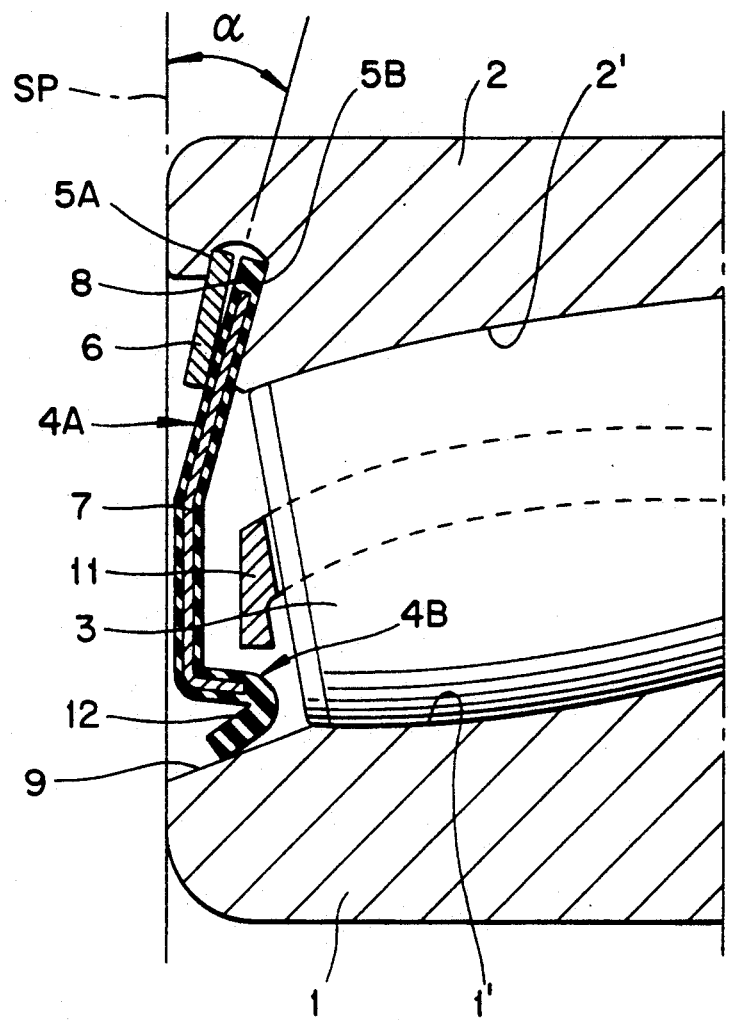
FIG. 1 shows a section through the sealing member affixed to a spherical roller bearing.
Figure 3:
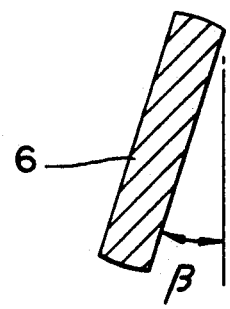
FIG. 3 is a detailed view showing a portion of the locking ring and illustrating its taper angle relative to the side surface of the race ring.
Figure 2:
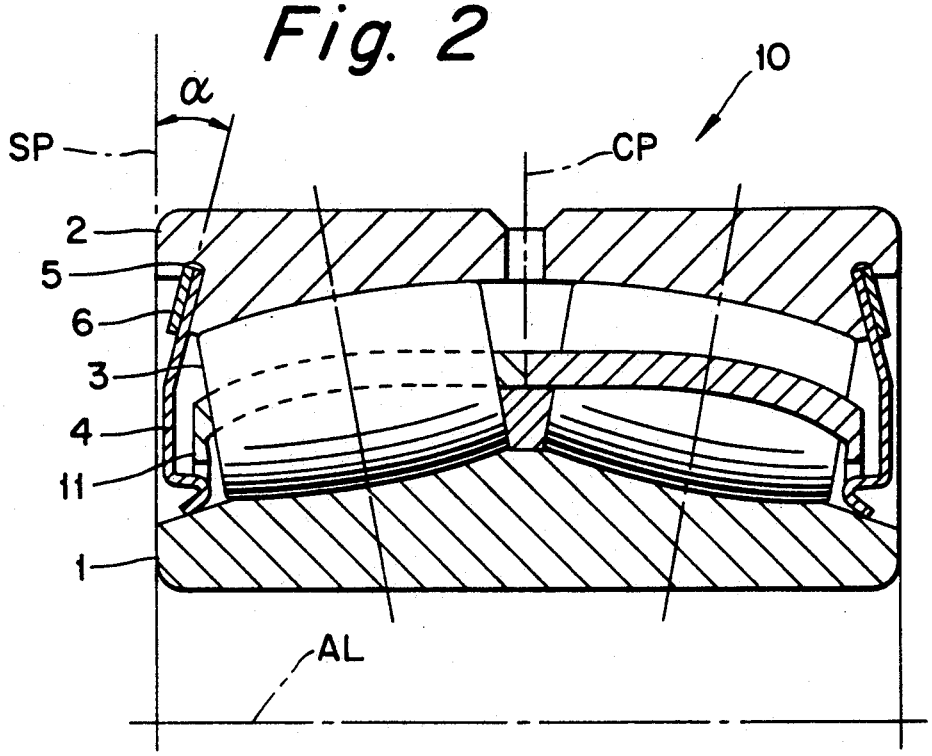
FIG. 2 shows a bearing in cross-section and having sealing members mounted thereto.

The spherical roller bearing 10 comprises an inner race ring 1 having an inner race track 1', an outer race ring 2 having an outer race track 2', rolling bodies preferably in the form of elongated rollers 3 arranged between the race rings in two rows, and a roller body cage 11. Both sides of the bearing 10 are provided with sealing members 4, which, as can be seen from the figures, are situated inside the side planes SP of the race rings.

The sealing members 4 are affixed in locking ring grooves 5 in the outer race ring 2. Each locking ring groove 5 has two side surfaces 5A, 5B which are inclined obliquely relative to the side plane SP of the outer race ring 2. That is, the groove 5 is tapered at an angle α relative to the side plane of the bearing in the position when this side plane SP is parallel to a diametrical center plane CP extending through the bearing. The centers of the different cones are situated on the axial center line of the bearing at some distance from the intersection of this center line with the side planes. Angle α is preferably 15 to 20 degrees.

Figure 4:
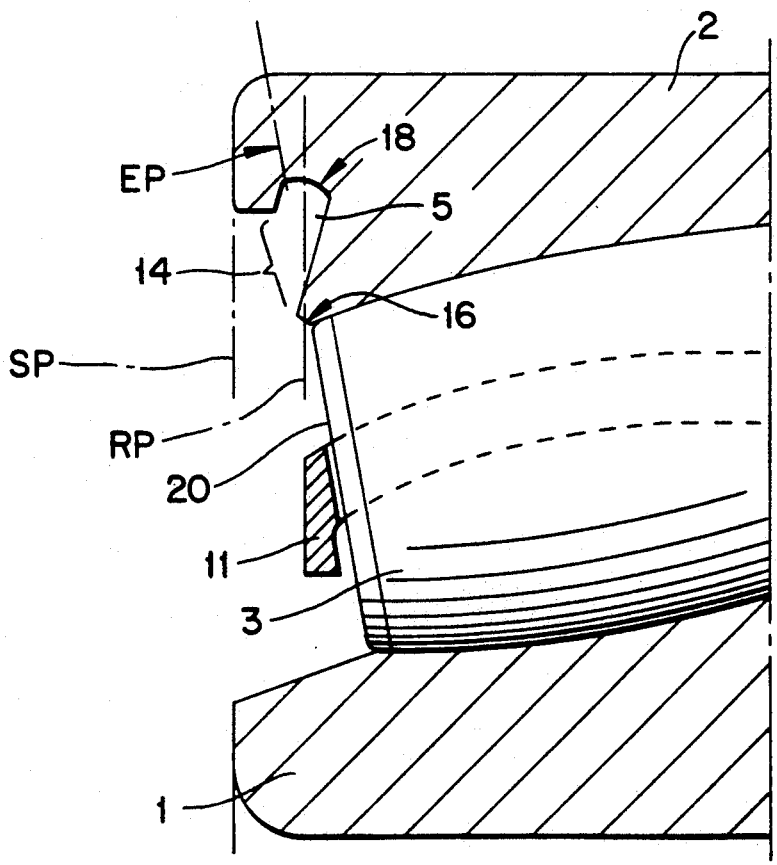
FIG. 4 is an enlarged fragmentary sectional view taken through one end of the bearing, and with the sealing member 4 removed.

The groove 5 includes an opening 14 at an outer end thereof (see FIG. 4). The opening 14 is disposed axially outwardly with respect to an outer axial end 16 of the outer race track 1'. At least a portion of an inner end 18 of the groove is situated axially inwardly with respect to a reference plane RP oriented parallel to the side plane SP and passing through the outer axial end 16. That is, at least a portion of the inner end 18 is situated axially inwardly of the outer axial end 16 of the outer race track. In addition, at least a portion of the inner end 18 of the groove 5 is situated axially inside of an extension plane EP in which an outer side 20 of the outer roller 3 lies.

The sealing member 4 comprises a circular plate ring 7, the outer part 4A of which, in a relaxed (non-assembled) state of the sealing member, tapers radially inwards at a taper angle substantially corresponding to the taper angle α of the locking ring groove 5, and the inner portion 4B of which is bent inwardly so as to be oriented generally parallel to the center axis line AL of the bearing once the seal has been assembled. The seal plate 7 is completely or partly enclosed in rubber 8, which for instance, is bonded to the plate by vulcanization. At the outer periphery of the plate ring 7, the rubber enclosure 8 may be defined as an extension of the plate 7. At its inner periphery, the enclosure constitutes an elongation 12, tapering angularly outwards and engaging a tapering surface 9 of the inner race ring. Alternatively, this surface 9 could be spherical.

The outer portion of the sealing member 8 is mounted in the locking ring groove 5 in the outer race ring 2, and it is affixed with a locking ring 6. Preferably the locking ring 6 has a tapering shape and has a taper angle β, preferably only a little smaller than the taper angle α of the locking ring groove. In the embodiment shown α is about 15°, whereas β is about 11°.

As the taper angle β of the locking ring 6 is smaller than α, a preload is obtained between locking ring 6 and the sealing member 4, which means that the sealing member is clamped by the locking ring, and a reliable and stable attachment is obtained. The sealing member 4 is detachable, whereby maintenance, inspection, and the like is facilitated.

It would be possible to use locking rings where β=0°, i.e., where the locking ring is not tapering when in a relaxed state, but becomes tapering when inserted in the groove. Such an embodiment would give a particularly strong clamping effect between the sealing member and the locking ring in the groove.

It is obvious that shape, choice of material, and the like for the sealing member 4 and also for the locking ring 6 may vary, depending upon the type of bearing.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A sealed bearing, comprising inner and outer race rings having inner and outer race tracks, respectively, said inner and outer race tracks being disposed opposite one another and forming a space therebetween, at least one row of rolling bodies arranged in said space, and a built-in sealing member engaging said inner and outer race members for sealing at least one axial end of said space, said outer race ring including a groove in which said sealing member is mounted, said groove being situated axially inwardly relative to a side plane of said outer race ring and including two side surfaces each being inclined obliquely relative to said side plane, said mounting groove including an opening at its outer end, said opening being disposed axially outwardly of an outer axial end of said outer race track, said groove including an inner closed end at least a portion of which extends axially inwardly of said outer axial end of said outer race track.

2. A sealed bearing according to claim 1, wherein said rolling bodies are cylindrical rollers.

3. A sealed bearing according to claim 1, wherein said sealing member is secured in said outer race ring by a locking ring inserted in said groove.

4. A sealed bearing according to claim 3, wherein said locking ring is tapered in its relaxed state and has a taper angle smaller than a taper angle of said groove to establish a preload between said groove and said sealing member.

5. A sealed bearing according to claim 4, wherein said taper angle of said locking ring groove is between 15 and 20 degrees.

6. A sealed bearing according to claim 3, wherein said locking ring is a planar ring.

7. A sealed bearing according to claim 1, wherein said sealing member 4 comprises a reinforcing plate coated with an elastomer, said elastomer engaged sealingly against a surface of the inner race ring.

8. A sealed bearing according to claim 7, wherein said surface of said inner race ring is spherical.

9. A sealed bearing according to claim 7, wherein said surface of said inner race ring is tapering.

10. A sealed bearing according to claim 1, wherein said bearing comprises a spherical roller bearing.

11. A sealed bearing, comprising inner and outer race rings having inner and outer race tracks, respectively, said inner and outer race tracks being disposed opposite one another and forming a space therebetween, at least one row of rolling bodies arranged in said space, and a built-in sealing member engaging said inner and outer race members for sealing at least one axial end of said space, said outer race ring including a groove in which said sealing member is mounted, said groove being situated axially inwardly relative to a side plane of said outer race ring and inclined obliquely relative to said side plane, said mounting groove including an opening at its outer end, said opening being disposed axially outwardly with respect to an outer axial end of said outer race track, said groove including an inner end at least a portion of which extends axially inwardly with respect to said outer axial end of said outer race track, said sealing member being secured in said outer race ring by a locking ring inserted in said groove.

* * * * *